United States Patent [19]

Glowny

[11] Patent Number: 5,805,897

[45] Date of Patent: Sep. 8, 1998

[54] SYSTEM AND METHOD FOR REMOTE SOFTWARE CONFIGURATION AND DISTRIBUTION

[75] Inventor: David Andrew Glowny, Naugatuck, Conn.

[73] Assignee: International Business Machines Corporation, Armonk, N.Y.

[21] Appl. No.: 369,991

[22] Filed: Jan. 9, 1995

Related U.S. Application Data

[63] Continuation of Ser. No. 923,126, Jul. 31, 1992, abandoned.

[51] Int. Cl.⁶ ...................................................... G06F 7/14
[52] U.S. Cl. .............. 395/712; 395/200.03; 395/200.09; 395/680
[58] Field of Search .................................. 395/700, 712, 395/200.03, 200.09, 680

[56] References Cited

U.S. PATENT DOCUMENTS

| | | | |
|---|---|---|---|
| 4,432,057 | 2/1984 | Daniell et al. | 364/300 |
| 4,558,413 | 12/1985 | Schmidt et al. | 364/300 |
| 4,724,521 | 2/1988 | Carron et al. | 364/200 |
| 4,731,750 | 3/1988 | Hoflich et al. | 364/900 |
| 4,825,354 | 4/1989 | Agrawal et al. | 364/200 |
| 4,851,988 | 7/1989 | Trottier et al. | 364/200 |
| 4,887,204 | 12/1989 | Johnson et al. | 364/200 |
| 4,891,785 | 1/1990 | Donohoo | 364/900 |
| 4,999,766 | 3/1991 | Peters et al. | 364/200 |
| 5,001,628 | 3/1991 | Johnson et al. | 364/200 |
| 5,008,814 | 4/1991 | Mathur | 364/200 |
| 5,019,963 | 5/1991 | Alderson et al. | 364/200 |
| 5,063,523 | 11/1991 | Vrenjak | 364/514 |
| 5,155,847 | 10/1992 | Kirovac et al. | 395/600 |
| 5,179,660 | 1/1993 | Devany et al. | 395/200 |
| 5,218,699 | 6/1993 | Brandle et al. | 395/650 |
| 5,247,683 | 9/1993 | Holmes et al. | 395/700 |
| 5,367,698 | 11/1994 | Webber et al. | 395/800 |
| 5,442,791 | 8/1995 | Wrabetz et al. | 395/650 |

OTHER PUBLICATIONS

Andrews, Bradley, E–Z Install V.2.R, Computer Language Mar. 1991 V8 n3 p. (80)(2).

*Primary Examiner*—Lucien U. Toplu
*Attorney, Agent, or Firm*—Lily Neff; Mark S. Walker; William A. Kinnaman, Jr.

[57] ABSTRACT

A system and method for remote software installation and maintenance. A number of workstations are connected by a network. Each has basic peer-to-peer communication ability providing remote file transfer and remote command execution. An arbitrarily selected workstation captures user installation requirements and controls installation and maintenance processing. Task lists are selected based upon requirements and the steps of the task list are executed locally, or remotely, to satisfy the installation or maintenance requirement. Task list process is logged so that processing may be resumed following a failure or intentional suspension.

15 Claims, 3 Drawing Sheets

SYSTEM AND METHOD FOR REMOTE SOFTWARE CONFIGURATION AND DISTRIBUTION

This application is a continuation of application Ser. No. 07/923,126, filed Jul. 31, 1992, now abandoned.

BACKGROUND OF THE INVENTION

1. Field of the Invention

The present invention relates to information processing systems and, more particularly, to system utilities for information processing systems. The present invention more particularly relates to systems and methods for installing and maintaining software on a collection of interconnected information processing systems.

2. Background and Related Art

Computer technology has developed networking technologies that allow the interconnection of multiple information processing devices in a network arrangement. Local area networks (LANs) interconnect a number of processors, typically, personal computers such as the IBM Personal System/2 (PS/2) Computer (Personal System/2 and PS/2 are trademarks of the IBM Corp.) or workstations such as the IBM RISC System/6000 (RISC System/6000 is a trademark of the IBM Corp.) Processors connected by a LAN are typically located in geographical proximity, though interconnections over several meters or kilometers is possible.

Even larger networks can be created using wide area network (WAN) technology. WANs frequently use telecommunication facilities to interconnect processors or LANs over large geographical areas.

An advantage of LAN interconnection is the ability to share programs and data files between users on the LAN. Sharing avoids the tasks of copying data to diskettes or tapes for sharing and may avoid the requirement to install multiple copies of a particular piece of software, e.g. a word processor, by installing a single shared copy on the network. In other cases, economies may be realized by sharing data files to avoid the need to copy the data to several locations.

LAN systems also provide a mechanism for workstations and computers to be connected to mainframe computers such as the IBM ES/9000 computer series. This form of interconnection permits workstations connected to the LAN to function as mainframe terminals, and, with the appropriate software, as consoles for the mainframe. An application of LAN technology to providing mainframe console support is described in commonly assigned pending patent application Ser. No. 07/771,064 entitled "Centralized Control for Distributed Application" which is hereby incorporated by reference.

A problem that frequently arises in a LAN system is the need to install and maintain software on the workstations that make up the network. This can require that all workstations operate using the same software at the same level of maintenance, or may simply be the requirement for one or more workstations to be able to use similar software.

Current solutions to this problem are twofold. One is to use diskettes or tapes containing the necessary software to install that software on each workstation on the LAN, one workstation at a time. A second alternative is to designate one (or possibly more) of the workstations as a "master" or "server" workstation that will maintain the latest level of software accessible to other workstations.

The use of diskettes and tapes is a problem due to the amount of manual effort required to install a product and to the generally slow input/output rates for those devices. Designation of a "master" or "server" computer also has disadvantages due to the creation of a single point of failure that could cause the entire operation to fail. Servers also have the disadvantage of requiring larger, more complex control software (such as the IBM OS/2 LAN Server Software (OS/2 is a trademark of IBM Corp.)). The larger software increases resource requirements for the network and may slow the network in certain instances.

There is therefore a technical problem of installing workstation software on LAN connected workstations via the LAN. This problem includes the need to perform the installation quickly and efficiently and to perform the installation locally and remotely. Finally, the problem requires an ability to monitor installation progress and provide assistance in restarting the installation.

SUMMARY OF THE INVENTION

The present invention is directed to solving these and other problems. The system of the present invention includes a collection of workstations interconnected via a LAN with no workstation necessarily functioning as a "master." The present invention provides a distributed software repository, local and remote installation mechanisms, and process control and progress tracking facilities. The method of the present invention includes capturing installation requirements through a common user interface program, initiating installation on the selected local or remote workstation, transferring files to the selected workstation, installing the files or maintaining the files on the selected workstation, and logging of changes and updates for future reference. The method further includes the ability to determine installation on restart after failure and to resume installation at the point of failure. Finally, the system and method implement a security key mechanism to prevent unauthorized access to software on the network or to the larger mainframe system.

It is therefore an object of the present invention to provide a software installation and maintenance system that is independent of master "server" computers. A second object is to provide a software installation and maintenance system that avoids a majority of manual installation tasks. It is yet another object of the invention to provide a LAN installation system and method that has the same interface for remote and local installation. It is yet another object of the invention to provide a LAN installation process that can be restarted from the point of failure after any installation failure.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
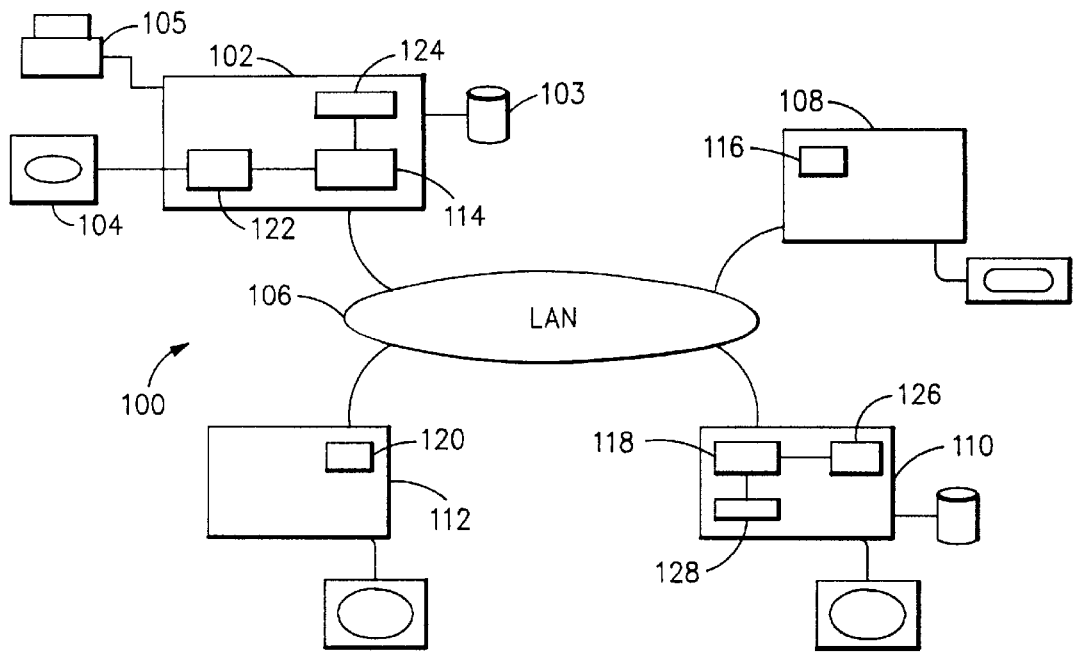
FIG. 1 is a block diagram of a LAN system incorporating the present invention.

A collection of workstations may be linked via a local area network (LAN) as shown in FIG. 1. Each workstation 100 has a system unit 102 containing processing function and memory, a display monitor and keyboard 104, and, optionally, input/output (I/O) devices such as an internal or external disk drive 103 or printer 105. The workstation is connected to a local area network (LAN) 106 to which other workstations, 108 110 112, are connected.

The present invention is designed to operate without a designated master workstation or server. Communication between the workstations over the LAN is implemented using peer-to-peer communication protocols such as the IBM APPC (LU 6.2) protocol. Each workstation includes basic communication software 114 116 118 120 in the system unit. The workstations need not be directly connected to each other as long as an indirect path exists between any two workstations, e.g. via a third workstation.

The basic communication software is directed to providing two services: remote file transfer and remote command execution. Remote file transfer controls the transfer of data files from one workstation to another. Remote command execution allows one workstation to cause a program or operating system command to be executed at another, remote workstation.

Software installation and configuration services are divided into two main components: the user interface 122 and the installation utilities 124. The user interface 122 controls all installer interactions collecting information on what is to be installed or maintained and where it is to be done. The installation utilities 124 provide software functions for local or remote installation and maintenance. The utilities 124 are written to avoid any user interaction gathering all necessary input parameters from data supplied by the user interface 122.

User interface 122 and utilities 124 can exist on one or more workstations such as, e.g. a duplicate set on workstation 110 shown as 126 and 128 respectively. Either set of utilities may be invoked for installation and maintenance of any workstation. This provides redundancy in case of a workstation failure. There is no limit to the number of workstations that can have or execute this code. A minimum set of interface programs 122 must reside on the workstation that initiates processing. In particular, the basic communications software for remote file transfer and remote command execution must be present. None of the other utilities 124 are required as they can be copied or accessed from another workstation as long as the basic communications software is present.

Figure 4A:
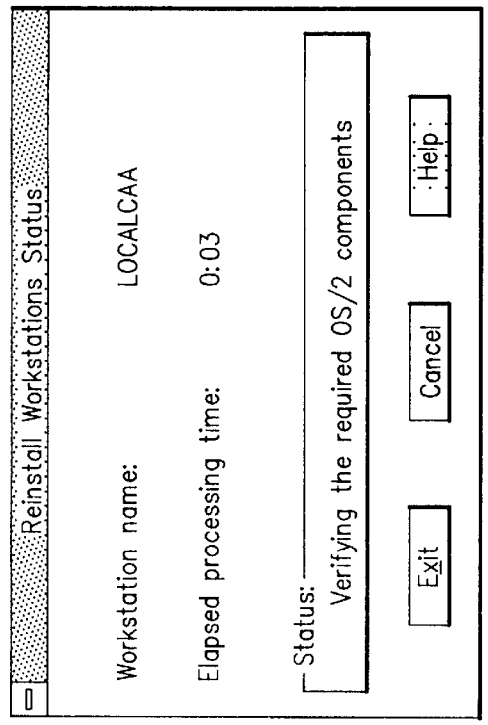
FIGS. 4(a)–4(c) are examples of user interface screens used to acquire and display process information in the preferred embodiment of the present invention.
Figure 4B:
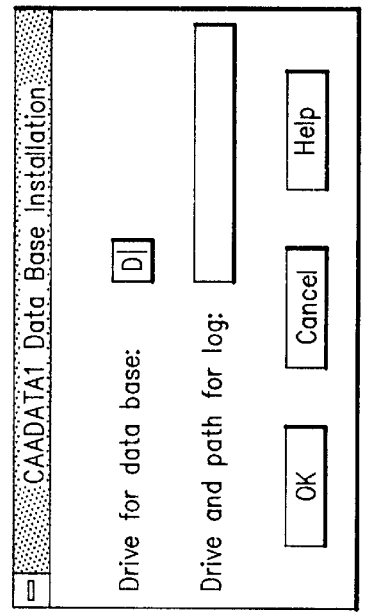
Figure 4C:
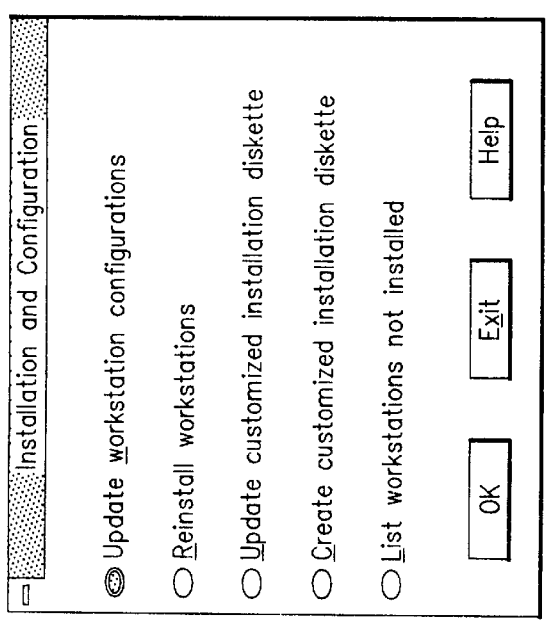

The preferred embodiment of the present invention implements user interface 122 the facilities of IBM OS/2 Presentation Manager dialog and message boxes. Presentation manager programs also provide status information regarding the progress of the software installation or maintenance activity. FIG. 4(*a*) is an example of a user interface screen allowing activity selection in the preferred embodiment. FIG. 4(*b*) is an example dialog box requesting information from the system user. FIG. 4(*c*) is a dialog box presenting installation status to the user of the system of the present invention.

Figure 2:
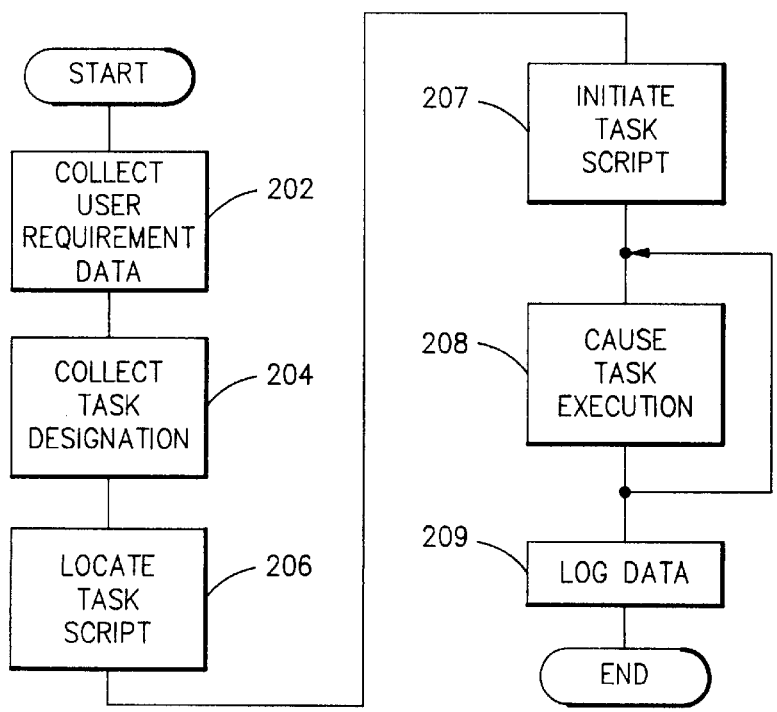
FIG. 2 is a flowchart depicting the logical steps of the method of the claimed invention.

The data captured by the user interface 122 is used to schedule control software installation and maintenance through the execution of utility functions 124. Utility functions include:

A. unpack files from a diskette
B. copy files from another workstation on a LAN
C. verify existence of pre-requisite software
D. write configuration data to a file
E. read configuration data from a file
F. check of existence of a database
G. delete a database
H. create a database
I. load initial data into a database
J. bind a database for use with SQL programs
K. record the installation status of a workstation
L. edit workstation configuration files
M. update the configuration files used by communications utilities such as the IBM Communication Manager
N. catalog remote database links
O. shutdown and reboot a workstation The installation and configuration method of the present invention involves the process steps shown generally in FIG. 2. The user interface 122 is used to collect user data requirements 202. The interface also collects task designation 204 that designates the type of task to be performed, such as software installation, software configuration, or software maintenance. Once a task has been designated the implementing task script is located 206. The task script is initiated 207 causing execution of each of the defined task steps 208. The preferred embodiment causes each script step to be executed as a new child process of the task script controller. This allows the status of each task item to be monitored and reported by the task script through the user interface. Upon completion of all task steps final task data is logged 209 to permanent storage.

Figure 3:
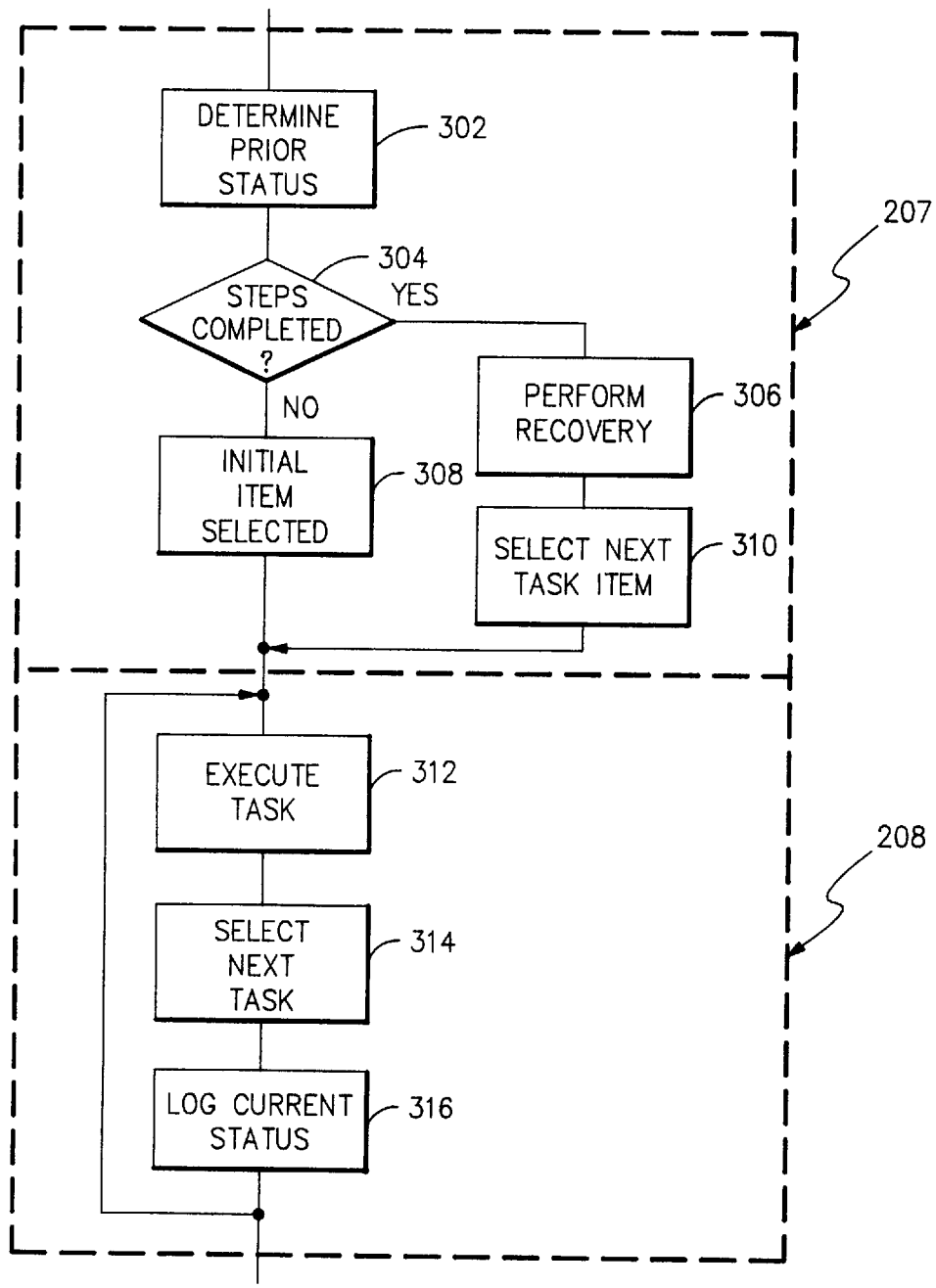
FIG. 3 is a flowchart depicting the process of an alternative embodiment of the present invention supporting suspension and restarting of processing.

An alternate embodiment of the present invention includes the ability to recover from an installation failure by beginning at the point of failure. This embodiment is shown in FIG. 3 showing alternate implementations of steps 207 208 of FIG. 2.

Task initiation 207 begins by determining prior status 302. The alternative embodiment logs each completed step so that the restart of a task can determine that last executed step and begin at that point. The status is tested 304 to determine whether or not steps had previously been completed. If so, any necessary recovery is performed 306 and the next sequential task identified 310. Recovery may include deleting partially copied files or backing up to previous configurations. If no steps had been previously completed, the first step is selected 308.

Task step execution 208 begins by executing the task 312 and then selects the next task, if any, 314. Task completion information is logged 316 in case of installation or configuration failure. Upon completion of all tasks, control passes to log data step 209 of the basic procedure.

The separation of data collection 202 from task execution 208 allows remote installation from an arbitrary point of control. The user interface runs on the point of control workstation, but actual task execution can occur remotely at the target workstation (or other workstation as appropriate, e.g. for file transfer.) The separation also enables the resumption of installation activities after an installation. At a remote workstation the installation software is automatically reactivated after rebooting thereby reinitiating communication and installation. Finally, because the user interface control point is monitoring installation status, the operator may suspend the tasks for later resumption.

In operation, the remote software installation and configuration software of the present invention offers significant advantages over prior art systems. Use of an arbitrary point of control for local and remote installation increases LAN administrator efficiency. Low overhead peer-to-peer remote file transfer and remote command execution provide processing flexibility without the cost and risks of a single server. This decentralized approach can reduce network bottlenecks and performance degradation. Additional efficiencies are found in the ability to restart after installation failure or to suspend and resume installation. These avoid the frustrating and costly process of starting from the beginning.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. In a system in which a plurality of workstations including a local workstation and a remote workstation are interconnected by a network, apparatus for performing a specified software installation operation comprising one or more tasks on said remote workstation, said apparatus comprising:

communication means at each of said workstation for communicating with the remaining workstation via said network, said means being operable to initiate from said local workstation the execution of a selected operation on said remote workstation;

installation means at said remote workstation for performing a specified software installation operation on said remote workstation in response to a command specifying said operation;

said installation also being capable of performing any other utility functions required for scheduling and controlling software installations such as configuration services, task designation, task prioritization and performance;

user interaction means at said local workstation for receiving user requirements specifying a software installation operation on said remote workstation; and task initiation means at said local workstation for initiating via said communication means the execution by said installation means of said specified software installation operation on said remote workstation.

2. Apparatus as in claim 1, further comprising said installation means at said local workstation, said task initiation means being selectively operable either:

to actuate the installation means at said local workstation to perform said specified software installation operation on said local workstation; or to actuate the installation means at said remote workstation via said communication means to perform said specified software installation operation on said remote workstation.

3. Apparatus as in claim 1 in which said communication means initiates the execution of said operation on said remote workstation using a remote command execution procedure.

4. The apparatus of claim 1 in which one of said tasks comprises copying software to said remote workstation from another workstation, said communication means being operable to copy said software from said other workstation to said remote workstation.

5. Apparatus as in claim 4 in which said communication means copies said software to said remote workstation using a remote file transfer procedure.

6. The apparatus of claim 1 in which said specified software installation operation comprises a plurality of tasks such as—packing and unpacking of data files, verifying existence of pre-requisite software or databases, deleting and creating databases, loading and storing data, shutting down or rebooting any workstation—said task initiation means initiating the execution by said installation means of each of said tasks.

7. The apparatus of claim 6 in which said task initiation means comprises:

means for generating a list of the tasks making up said specified software installation operation; and means for initiating the execution by said installation means of each of the tasks contained in said list.

8. The apparatus of claim 6 in which said task initiation means comprises means for recording the completion status of each of said tasks.

9. In a system in which a plurality of workstations including a local workstation and a remote workstation are interconnected by a network, a computerimplemented method of performing a specified software installation operation on said remote workstation, comprising the steps of:

providing an installation program at said remote workstation for performing a specified software installation operation on said remote workstation in response to a command specifying said operation;

receiving user requirements at said local workstation to specifying a software installation operation on said remote workstation;

remotely initiating from said local workstation via said network the execution of said specified software installation operation by said installation program on said remote workstation; and said software installation also comprising the performance of configuration services, task designation, and task prioritization and performance.

10. The method of claim 9 in which said the execution of said command is initiated on said remote workstation using a remote command execution procedure.

11. The method of claim 9 in which one of said tasks comprises copying software to said remote workstation from another workstation.

12. The method of claim 11 in which said software is copied to said remote workstation using a remote file transfer procedure.

13. The method of claim 9 in which said specified software installation operation comprises a plurality of tasks, said initiating step comprising the step of remotely initiating the execution of each of said tasks.

14. The method of claim 13 in which said initiating step comprises the steps of:

generating a list of the tasks making up said specified software installation operation; and remotely initiating the execution of each of the tasks contained in said list.

15. The method of claim 13 in which said initiating step comprises the step of recording the completion status of each of said tasks.

* * * * *